United States Patent [19]
Apt, Jr. et al.

[11] 3,870,078
[45] Mar. 11, 1975

[54] SAMPLING SLIDE VALUE

[75] Inventors: Jerome Apt, Jr.; William J. Wachter; Wesley M. Rohrer, Jr., all of Pittsburgh, Pa.

[73] Assignee: USC Incorporated, Pittsburgh, Pa.

[22] Filed: Oct. 18, 1972

[21] Appl. No.: 298,479

Related U.S. Application Data
[62] Division of Ser. No. 195,419, Nov. 3, 1971.

[52] U.S. Cl. ............................ 137/625.48, 251/325
[51] Int. Cl. ............................................. F16k 11/06
[58] Field of Search..... 137/625.11, 625.12, 625.13, 137/625.17, 625.48, 627; 251/325; 73/421 R, 421.5 R, 423 R, 423 A

[56] References Cited
UNITED STATES PATENTS

| | | | |
|---|---|---|---|
| 2,208,682 | 7/1940 | O'Brien............................ | 137/627 X |
| 2,528,843 | 11/1950 | Poor ................................ | 137/627 X |
| 2,822,783 | 2/1958 | Clifton et al.................... | 137/625.12 |
| 2,906,492 | 9/1959 | Conrad ............................. | 251/325 |
| 3,000,399 | 9/1961 | Brunker .......................... | 137/625.48 |

*Primary Examiner*—William R. Cline
*Attorney, Agent, or Firm*—Webb, Burden, Robinson & Webb

[57] ABSTRACT

An elongated slide valve for detecting fuel leaks in a nuclear reactor has a plurality of sampling ports along one side of a valve body and a plurality of intermittently spaced flush ports along an opposing side of the valve body. A slide member alternately communicates with sampling port and flushing port as it sequentially samples the various fuel subassemblies of the reactor through the sampling ports. A single outlet chamber and throughgoing conduit exits each sample from the nuclear reactor to monitoring equipment. The reactor coolant is employed as the flush between samples and as the seal for the slide member. The slide valve is operated by the control rod drive mechanism.

5 Claims, 10 Drawing Figures

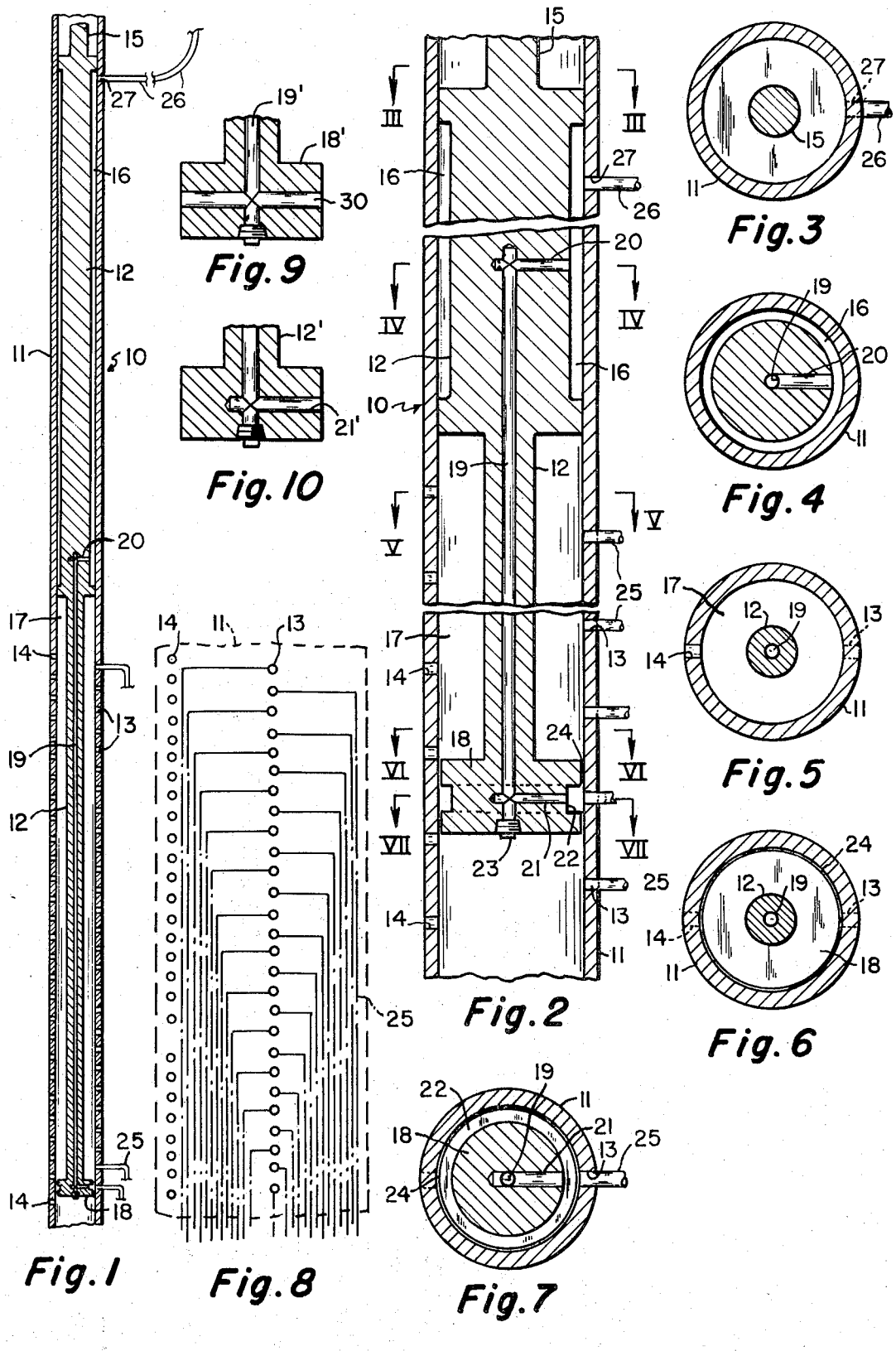

SAMPLING SLIDE VALUE

This is a division of application Ser. No. 195,419, filed Nov. 3, 1971.

Our invention relates to fluid cooled nuclear reactors and, more particularly, to a detecting system for revealing defects in the fuel subassemblies of the nuclear reactor.

A number of detecting systems are known for revealing ruptures or similar faults in the cladding which surrounds the individual fuel pins in the reactor core fuel subassemblies. In the event of a fault in the cladding, the radioactivity which escapes from the fuel pin contaminates the fluid coolant flowing along the fuel subassemblies. The increases in radioactivity of the coolant is detected by a main monitoring system which measures the radioactivity of the coolant as it flows out of the reactor.

Since a nuclear reactor contains a large number of fuel subassemblies, each of which is comprised of a plurality of individual fuel pins, it is necessary to not only know when there is a substantial leak in a particular fuel subassembly, but it is also necessary to locate and verify which particular fuel subassembly is defective. Conventional detecting systems include a large number of separate sampling conduits, usually one for each fuel subassembly, which pass through the reactor to an exterior monitoring system. This, of course, necessitates the need for a large number of throughgoing conduits with valves and sealing material, etc.

Several internal valving systems have been suggested in which rotary valves are employed within the reactor with only a few conduits passing through the reactor wall to the monitoring system. However, these rotary valves, for the most part, have proven unreliable because of the complexities required to handle so many incoming samples without sample to sample dilution or mixing.

Our invention overcomes the disadvantages of the known detecting systems and provides a system which can function successfully while the reactor is operating, regardless of the power level. In addition, the system is as sensitive as the sensitivity of the monitoring device and the presence of high radiation backgrounds and primary loop contaminates does not affect the functioning or sensitivity of the system. Further, the system inherently is capable of discriminating between normal primary coolant contamination and the results of fuel pin cladding failures.

The system operates effectively regardless of the fuel, the geometry of the fuel pins or the type of coolant employed. In addition, the system is very compact and operable from existing equipment, thus requiring no additional design to the normal reactor. The system can both detect the existance of a failed fuel pin and also verify its location and the signals from the system can be remotely indicated or stored and are compatible with standard analog digital date handling equipment.

The environment present at the particular nuclear reactor site has no effect on the system and, because the system is wholly integrated, there is no need for systems other than the normal existing monitoring and analysis system which provides normal cover gas analysis and reactor coolant discharge analysis.

Our invention is a multi-port elongated slide valve in which the sampling ports are positioned along one side of the valve body and a plurality of flush ports are positioned on the opposing side of the valve body with a flushing port being positioned intermediate adjacent sampling ports. A movable slide member operates within the valve body to alternately sample from a sampling port and a flush port while sequentially sampling each sampling port which communicates with the various fuel subassemblies. The reactor coolant acts as the flush between successive samples and as a seal for the slide member. A single outlet chamber having an outlet orifice communicates with a central sample duct of the slide member and with a leak detection monitoring system on the exterior of the reactor. The slide valve is operated by the central rod drive mechanism.

In the accompanying drawings, we have shown a presently preferred embodiment of our invention in which:

FIG. 1 is a section through our slide valve;

FIG. 2 is an enlarged broken away section of the slide valve;

FIG. 3 is a section taken along lines III—III of FIG. 2;

FIG. 4 is a section taken along lines IV—IV of FIG. 2;

FIG. 5 is a section taken along lines V—V of FIG. 2;

FIG. 6 is a section taken along lines VI—VI of FIG. 2;

FIG. 7 is a section taken along lines VII—VII of FIG. 2;

FIG. 8 is a representation of the flushing ports and the sampling ports and tubing directed thereto from the fuel subassemblies;

FIG. 9 is a section of a modified slide head; and

FIG. 10 is a section through another modified slide head.

A nuclear reactor contains many fuel subassemblies, each of which is made up of a large number of individual fuel pins. These fuel subassemblies are normally divided into groups with each group being operable through a particular control in a given sector of the nuclear reactor. Each sector of the nuclear rector normally has an instrument tree column which supports and contains the instrumentation, control rods and scram rods for the fuel subassemblies and ancillary equipment within that particular sector. Our detection system is adaptable for mounting to such an instrument tree and in a typical nuclear reactor having three sectors, there will be three such detection systems employed. Our device is compatible with any of the existing nuclear reactors which are fluid cooled and with any of the existing fluid coolants by they water, gas or liquid metals.

Our detection system comprises a slide valve 10 having an elongated valve body 11 and elongated slide member 12 operable therein, FIG. 1 and 2.

The valve body 11 is cylindrical and contains along the bottom portion thereof a plurality of equally spaced and aligned sampling ports 13 along one side of the valve body 11. Specifically, twenty seven sampling ports 13 are shown and will sample twenty seven separate fuel subassemblies (not shown) in the nuclear reactor. A plurality of spaced and aligned flush ports 14 are positioned 180° removed about the cylindrical valve body 11 from the sampling ports 13. It is necessary that a flush port 14 be positioned between each two sampling ports 13 which are adjacent each other. In addition, a flush port 14 will also be positioned at the extreme top and/or bottom of the aligned ports so that each sampling cycle starts or ends with a sample from a flush port 14. The flush ports 14 are positioned at one-half pitch or midway between the sampling ports 13 for reasons to be described hereinafter. The flush ports 14 are open to the reactor plenum and the standard reactor coolant passes therethrough.

The elongated slide member 12 is freely positioned within the cylindrical valve body 11 and is mounted at its upper end on a long shaft 15, FIGS. 1-3, driven by a standard control rod drive mechanism, not shown. The control rod drive mechanism is primarily used to operate the control and scram rods, but is easily adapted to control the sequential sampling operation of the detecting system.

The control drive mechanism is normally an electromechanical device, although hydraulic and pneumatic systems have also been employed. The control drive itself imparts a linear or swinging motion to the control rods. This is normally accomplished through a slow-speed, reversible drive in which there is a high-speed overriding drive to operate the scram rods in case of the need for a rapid reactor shutdown. Our novel method of operation is the use of the control drive mechanism to operate the leak detection apparatus. The exact mechanical hook-up and the components for the sequential control of the sampling do not form a part of this invention. It will be recognized by those skilled in the art that a variety of known hook-ups and components to control a sequential sampling can be employed.

Slide member 12 has an upper section which defines an outlet chamber 16, generally annular, between the outer slide wall and the inner wall of the valve body 11, FIG. 4. Outlet chamber 16 in turn communicates with monitoring equipment external of the reactor via throughgoing conduit 26 which connects to chamber 16 at orifice 27. The lower section of the slide member defines an annular chamber 17 of substantial cross section, FIG. 5 and 6, between the outer slide wall and the inner wall of the valve body 11. This annular chamber 17 communicates with and is open to the flush ports 14 and the sampling ports 13.

The slide member 12 terminates in an enlarged piston type head 18, FIGS. 2 and 7. A central duct 19 extends longitudinally through the slide member 12 and terminates at its upper and in a crossover duct 20 which communicates with outlet chamber 16. The central duct 19 communicates at its lower end with a sampling duct 21 in the enlarged head 18. The sampling duct 21 extends from the central duct 19 transversely through the head 18 in the direction of the sampling ports 13 and terminates in an annular chamber 22 which encircles and is recessed within the head 18. The central duct 19 actually extends through head 18 and is shut off by plug 23 which threadably engages head 18. This plug arrangement is employed to simplify the manufacture of the elongated slide member 12.

The head 18 is critically dimensioned to form a slight gap 24 between the head 18 and the inner wall valve body 11, and thus allow free movement and prevent binding head 18 and the inner wall of valve body 11, FIGS. 6 and 7. Head 18 is also dimensioned so that when the sampling duct 21 is directly aligned with a sampling port 13, the head 18 will extend between adjacent flushing ports 14, FIG. 2.

Each sampling port 13 is connected to a particular fuel subassembly outlet or group of subassembly outlets by means of tubing 25. This tubing 25 will normally extend from the sampling port 13 to the axial center line of a particular fuel subassembly, not shown. Because of the large number of sampling tubes 25 necessary, the tubes 25 from adjacent sampling ports 13 are staggered to maximize the compactness of the large array of tubes 25, FIG. 8. This staggered relationship permits the tubes 25 to be completely supported from the instrument column so as to prevent flow-driven vibrations.

The actual sampling of the fuel subassemblies is accomplished through the inherent pressure differentials within the reactor itself which provides for the movement of coolant from an area of high pressure to an area of low pressure. When the slide member 12 is positioned by the control drive mechanism so that the sampling duct 21 is in direct alignment with a sampling port 13, the coolant from the sampling port and the particular fuel subassembly communicating therewith will be driven into the central duct 19 because of the lower pressure within the central duct 19. Because of the construction of gap 24, the pressure from the sampling port 13 will be greater than from the flush ports 14 and, therefore, the sample will not be dilluted by the coolant. However, the coolant from the flush ports 14 provides a seal between the enlarged head 188 and the valve body 11.

When the slide member 12 is moved by the control drive mechanism so that the annular chamber 22 of head 18 is in alignment with a flush port 14, the pressure will be greater at the flush port than from the fluid leakage at the sample ports 13 and, therefore, the reactor coolant will be drawn into the central duct, as a flush.

In other words, reactor coolant is continually entering and leaving chamber 17 through the flush ports 14 and coolant from sampling ports 13 is also continually bled into chamber 17, but these coolants do not dilute or mix with the particular sample or fl'' '- being taken.

The fluid sample in the central duct 19 passes into the outlet chamber 16 via the crossover duct 20 and through the orifice 27 and conduit 26 into the monitoring equipment on the exterior of the reactor. By knowing the dwell time, that is, the time it takes a sample to travel a known distance under known conditions, the monitoring equipment can distinguish between the particular sample from a sampling port and the flush coolant.

The slide member 12 moves in sequence from a sampling port 13 to a flush port 14 and then to the next sampling port 13 in a timed sequence, this sequence being programmed into the control drive mechanism. The sequence may be monitored so that when a leak is detected from a sampling port 13, an additional time period for sampling is automatically programmed to verify the leakage at that sampling port 13. Of course, the readout from the monitoring equipment will identify the particular fuel subassembly from which the sample is being taken.

It is also possible to monitor the reactor coolant from the flush ports 14 to identify the particular sector of the reactor having coolant contamination. Presently only the coolant at the discharge end of the reactor is monitored, in which case one only knows that there is a leak somewhere in the reactor. In other words, the flush coolant can be monitored to detect the particular sector of the reactor which has a failed fuel subassembly or subassemblies and then the particular fuel subassembly which has caused the failure is also identified and then verified by the additional sample time at that particular fuel subassembly.

The slide valve can be modified in several respects and still accomplish the same result. For example, the slide member 12' need not include the annular chamber 22. In this situation the sampling duct 30 extends clear through the enlarged head 18' to permit the withdrawing of a sample or a flush, as the case may be, into the central duct 19', FIG. 9. The sampling duct 21' need only extend as in the preferred embodiment, FIG. 10. In this latter instance the slide member 12' is rotated 180° as it moves from sample port to flush port, thereby again accomplishing the desired sequential sampling. A plurality of chambers can be recessed radially outward from the valve body in the area of the sampling ports and/or flush ports, but this arrangement is somewhat impractical and is not illustrated.

We claim:

1. A sampling slide valve device comprising:
   A. an elongated valve body having a plurality of equally spaced sampling ports along a first end portion of one side of the valve body and a plurality of equally spaced flush ports on an opposing side of the valve body along the first end portion, a flushing port being positioned between each adjacent sampling port;
   B. a movable slide member freely positioned in the valve body and having an enlarged sampling head with a sampling duct therein communicating with a central duct in the slide member, said sampling duct adapted to alternately communicate individually with each of said sampling and flush ports, respectively, said head being dimensioned to form a slight gap between the head and the valve body and to extend between adjacent flush ports when the sampling duct is in communication with a sampling port;
   C. an outlet chamber formed between the slide member and an end portion of the valve body opposite the first end portion, said central duct communicating therewith; and
   D. an outlet orifice communicating with the outlet chamber.

2. The slide valve device of claim 1 wherein the flushing ports are spaced midway between the sampling ports.

3. The slide valve device of claim 1 wherein the outlet chamber extends a distance at least equal to the distance between opposing end sampling ports.

4. The slide valve device of claim 1 wherein the enlarged sampling head includes a perimetrical chamber communicating with the sampling duct.

5. The slide valve device of claim 1 wherein the sampling duct extends transversely clear through the enlarged head.

* * * * *

UNITED STATES PATENT OFFICE
CERTIFICATE OF CORRECTION

PATENT NO. : 3,870,078
DATED : March 11, 1975
INVENTOR(S) : Jerome Apt, Jr. et al.

It is certified that error appears in the above-identified patent and that said Letters Patent are hereby corrected as shown below:

On the first page of the patent - Line 1 - In the Title
--VALUE-- should read --VALVE--.
Column 1 - In the Title --VALUE-- should read --VALVE--.
Column 1 Line 14 --increases-- should read --increase--.
Column 2 Line 6 After --acts-- insert --both--.
Column 2 Line 29 --and tubing-- should read --and the tubing--.
Column 2 Line 49 --by-- should read --be--.
Column 2 Line 53 --FIG.-- should read --FIGS.--.
Column 3 Line 38 --FIG.-- should read --FIGS.--.
Column 3 Line 45 --and-- should read --end--.
Column 4 Line 18 --driven-- should read --drawn--.
Column 4 Lines 19 & 20 --con-struction-- should read --constriction--.
Column 4 Line 24 --head 188-- should read --head 18--.
Column 4 Line 37 --fl-- should read --flush--.

In Claim 1 - Column 5 Line 26
The sentence beginning with the letter --B-- should be moved out to the margin.

Signed and sealed this 27th day of May 1975.

(SEAL)
Attest:

RUTH C. MASON
Attesting Officer

C. MARSHALL DANN
Commissioner of Patents
and Trademarks